June 20, 1944.   B. R. KOENIG   2,351,770
DEVICE FOR MEASURING THICKNESS OF OBJECTS
Filed Dec. 17, 1943
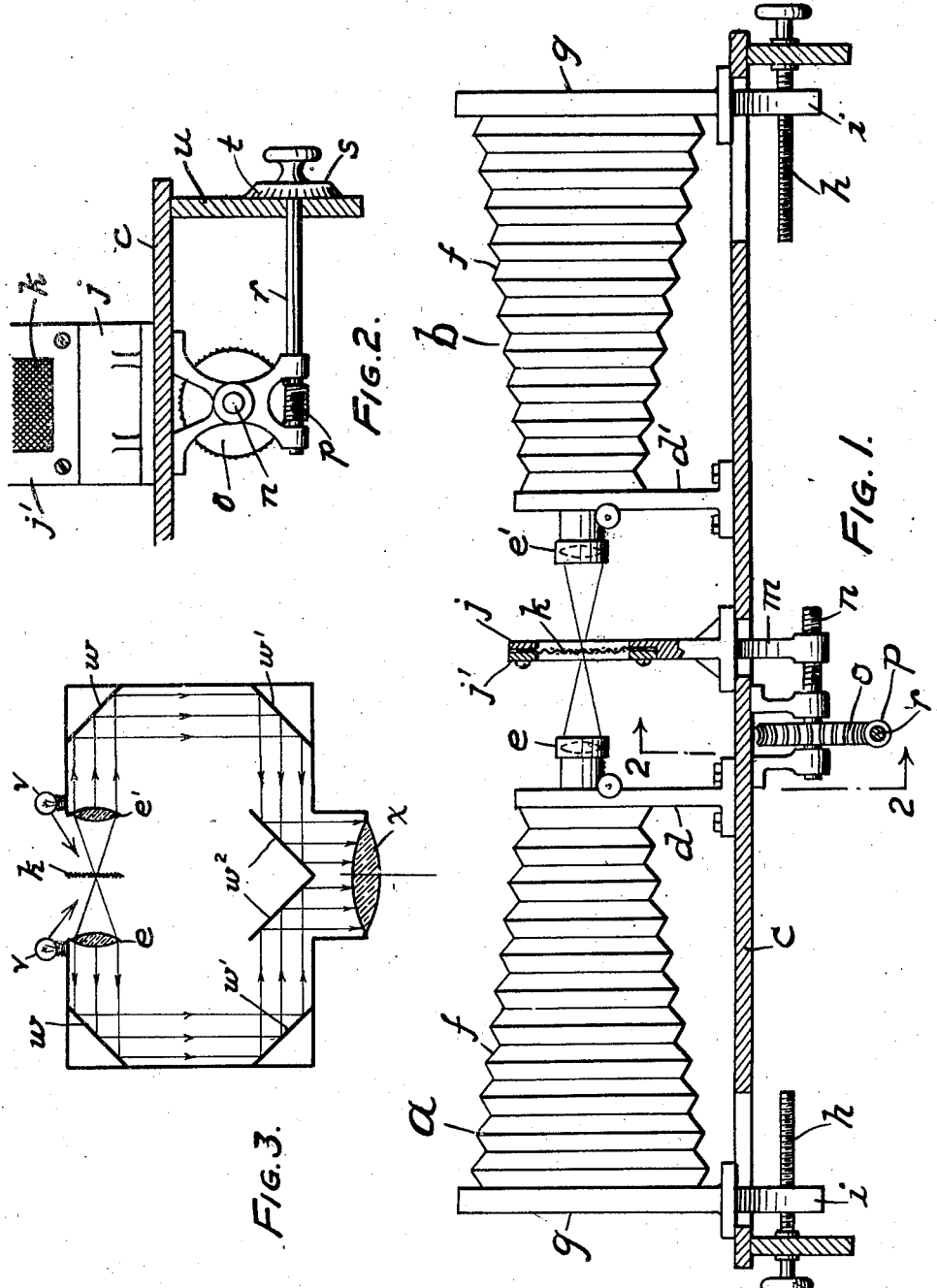
WITNESS:
INVENTOR
Bernard R. Koenig
BY
Busser and Harding
ATTORNEYS.

Patented June 20, 1944

2,351,770

UNITED STATES PATENT OFFICE 2,351,770

DEVICE FOR MEASURING THICKNESS OF OBJECTS

Bernard R. Koenig, Westgate Hills, Pa., assignor to Prodesco Incorporated, Philadelphia, Pa., a corporation of Pennsylvania Application December 17, 1943, Serial No. 514,603

2 Claims. (Cl. 88—1)

The object of my invention is to provide a means for accurately measuring the thickness of any relatively thin article of manufacture and is especially adapted to the determination of the thickness of articles having a soft contour, being particularly, but not necessarily solely, adapted to determine the thickness of fabrics.

Two embodiments of the invention are shown in the drawing. Fig. 1 is a side elevation of one embodiment of the invention. Fig. 2 is a cross-section on the line 2—2 of Fig. 1. Fig. 3 is a diagrammatic view of a modification.

Referring first to Figs. 1 and 2:

The embodiment of the invention shown in Fig. 1 comprises two instruments, $a$ and $b$, of the character of photographic cameras. The cameras are supported on a frame $c$ and their lens boards $d$, $d'$, are so positioned that their matched lenses $e$ and $e'$ are focused on the same optical plane or point. To each lens board is attached a double or triple extension bellows $f$ with ends $g$ which hold focusing or viewing ground glasses. Each end $g$ is adjustable by any convenient means, such as by a rod $h$ threaded in an ear $i$ dependent from the focusing or viewing end $g$, or by any finer adjusting means, such as that described below for adjusting the position of the fabric.

Between the two lenses $e$ and $e'$ is a fabric-holding frame $j$, which extends vertically at precisely a right angle to the optical axis of the lens system. The frame $j$ may have a removable section $j'$ to enable a fabric $k$ to be clamped within the frame. Each frame section may be rubber-lined, or ground, to enable the fabric to be firmly grasped between them.

The frame $j$ may be supported from a bracket $m$ in which is threaded a rod $n$ carrying a worm wheel $o$ operable by a worm $p$ on a turntable shaft $r$, which carries a disc $s$ provided with a scale $t$. The zero mark on scale $t$ should register with a mark on a bracket $u$ dependent from the frame $c$. When the vernier is so adjusted the central plane of the frame $j$ will be precisely midway between the two lenses $e$ and $e'$; that is, the common focal point of the two lenses will lie within such plane.

After a fabric $k$ is inserted in the frame $j$, the latter is moved, in a direction at right angles to the plane of its extension, by means of the vernier above described, until one face of the fabric is moved into the plane in which the common focal point of the two lenses is located. This can be determined by observing the fabric through the viewing glass of that one of the two instruments opposite the face of the fabric in which the common focal point of the two lenses is located. The mark recorded on the vernier scale on one side of the zero mark is noted and the vernier is then operated to move the frame $j$ in the opposite direction until the other face of the fabric is moved into the plane on which the common focal point of the two lenses is located. This can be determined by observing the fabric through the viewing glass of the other instrument. The mark recorded on the vernier scale on the other side of the zero mark is noted. From the sum of the two recorded marks, the thickness of the fabric may be determined.

An alternate arrangement is shown diagrammatically in Fig. 3. In this arrangement light rays from sources of light $v$, $v$ are directed against against opposite faces of the fabric $k$. The light rays from opposite sides of the fabric are directed through the lenses $e$ and $e'$ to a series of reflectors $w$, $w^1$, $w^2$ through a single or double viewing lens $x$. A single lens is shown through each half of which one side of the fabric may be viewed. The fabric may be supported from a frame similar to frame $j$, $j'$ and this frame may be adjusted toward one or the other of the two lenses $e$ and $e'$ by the means described for adjusting the frame $j$, $j'$ and such means may embody a similar vernier scale.

It is obvious that other specific modifications may be devised by those skilled in the art. For example: Instead of moving the frame $j$ along the optical axis of the lens system first toward one lens $e$ and then toward the other lens $e'$, the frame may be stationary and the two lenses may be moved along said optical axis, first in one direction and then in the other, to thereby bring first one face, and then the other face, of the fabric into the plane in which the common focal point of the two lenses is located. The two lenses may be so moved together by the means described for moving the frame $j$ and such means should embody a similar vernier scale.

In another feasible modification, after the lenses are so adjusted as to have a common focal point between the two faces of the fabric, one lens may be moved along said optical axis to bring its focal point into a plane coincident with one face of the fabric and the other lens then moved along said optical axis to bring its focal point into a plane coincident with the other face of the fabric. The two lenses may be independently moved by means like those described for moving the frame $j$ and such means should embody a similar vernier scale. In these modifications, the movement of the frame is relative to the lenses, as in the two embodiments of the invention first herein described.

What I claim and desire to protect by Letters Patent is:

1. An optical device for measuring the thickness of an object, including a lens system comprising two spaced apart lenses having a common focal point, a frame, positioned between said lenses, adapted to support said object at a right angle to the optical axis of the lens system, means to effect movement of said frame relative to the lenses along said optical axis into two positions in one of which the focal point of one lens will coincide with one face of the object while in the other of which the focal point of the other lens will coincide with the other face of the object, and registering means, observable in the adjustment to said two positions, indicative of the distance between them and thus of the thickness of the article.

2. An optical device for measuring the thickness of an object, including a lens system comprising two spaced apart lenses having a common focal point, a frame, positioned between said lenses, adapted to support said object at a right angle to the optical axis of the lens system, means to effect movement of said frame along said optical axis relative to the lenses into two positions in one of which the focal point of one lens will coincide with one face of the object while in the other of which the focal point of the other lens will coincide with the other face of the object, an eye piece upon which light rays passing through said lenses impinge and by means of which the specified relative adjustments of the frame and lenses to said two positions may be effected and observed, and registering means, observable in the adjustment to said two positions, indicative of the distance between them and thus of the thickness of the article.

BERNARD R. KOENIG.